April 3, 1934.  L. L. NAKASHIAN  1,953,187

POWER TRANSMITTING COUPLING OR CLUTCH

Original Filed Dec. 30, 1929   3 Sheets-Sheet 2

Inventor:
Luke L. Nakashian.
By Owen N. Kennedy
Attorney

April 3, 1934.   L. L. NAKASHIAN   1,953,187
POWER TRANSMITTING COUPLING OR CLUTCH
Original Filed Dec. 30, 1929   3 Sheets-Sheet 3

Inventor:
Luke L. Nakashian.
By Owen W. Kennedy
Attorney

Patented Apr. 3, 1934

1,953,187

UNITED STATES PATENT OFFICE 1,953,187

POWER TRANSMITTING COUPLING OR CLUTCH

Luke Lewis Nakashian, Worcester, Mass.

Application December 30, 1929, Serial No. 417,431
Renewed August 4, 1933

7 Claims. (Cl. 192—52)

The present invention relates to an improved power transmitting coupling, or clutch, that is adapted to connect rotatable driving and driven elements for the transmission of power therebetween, in such a manner that a load can be started and rapidly brought up to normal operating speed without imparting too heavy a load on the prime mover, such as an electric motor.

The coupling or clutch of the present invention is particularly characterized by its ruggedness, simplicity and ease of operation as well as by its particular manner of operation whereby varying amounts of power may be transmitted from the prime mover to meet varying load conditions. The above and other advantageous features of the invention will hereinafter more fully appear with reference to the accompanying drawings, in which—

Like reference characters refer to like parts in the different figures.

Figure 1:
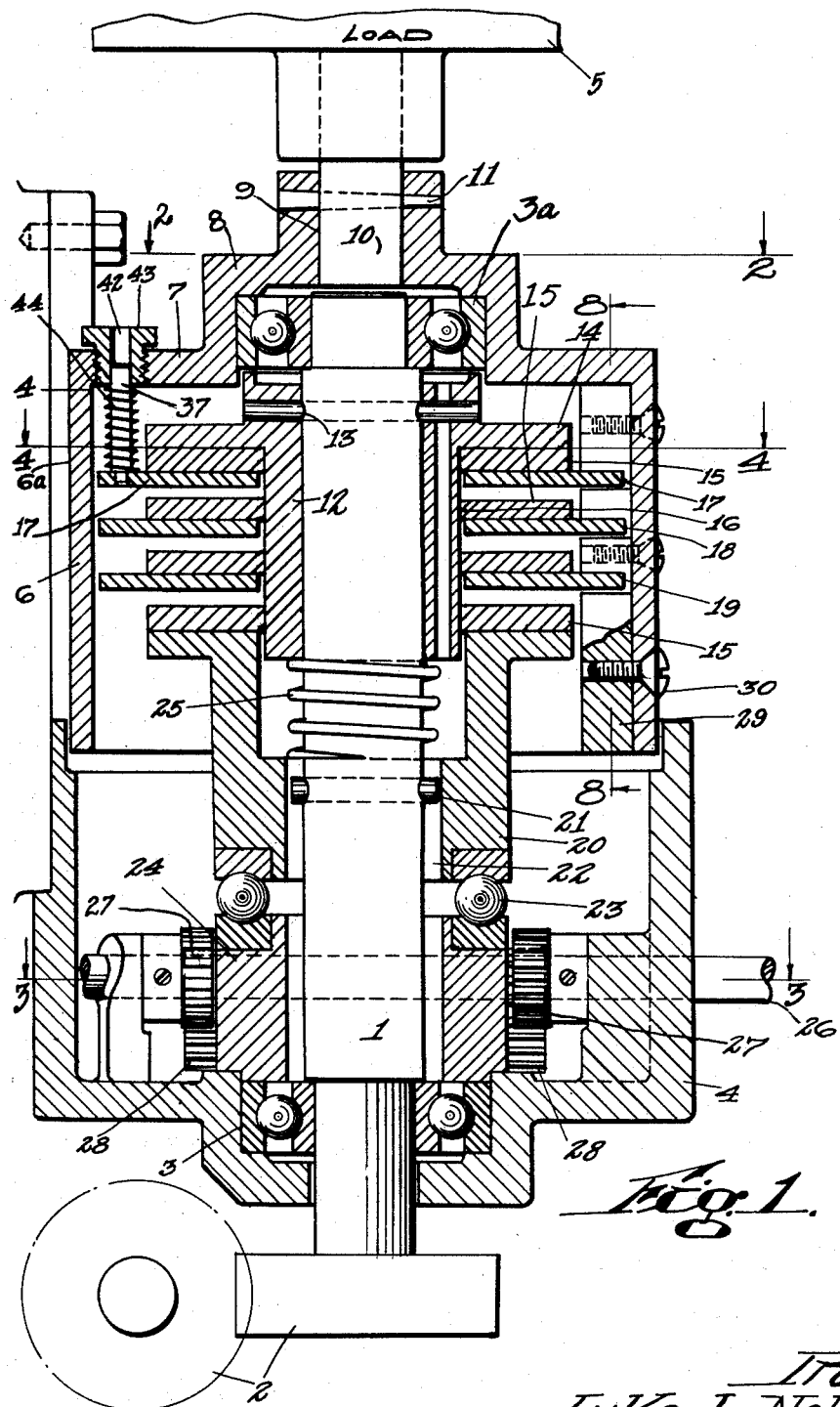
Fig. 1 is a vertical sectional view of a coupling or clutch embodying my invention.

Referring to the drawings, the driving element is represented by a shaft 1 to which power is applied in any suitable manner from a prime mover such as an electric motor, the shaft being connected to the prime mover either directly or by reduction gearing 2 as indicated. The shaft 1 is rotatably supported in a vertical position by a bearing 3, carried by a stationary housing 4. The driven element is generally designated by the reference character 5 and in the illustrative embodiment of the present invention, the driven element is shown connected to a cylindrical drum 6. The upper end of the drum 6 is closed by a flange 7 which provides a hub portion 8 for receiving an upper shaft bearing 3a, so that the driving shaft 1 may rotate independently of the drum 6 when the coupling is inoperative. The hub 8 provides an opening 9 for receiving a stud 10 carried by driven element 5, the stud 10 being coaxial with the shaft 1 and being connected to the hub 8 by a pin 11.

Figure 4:
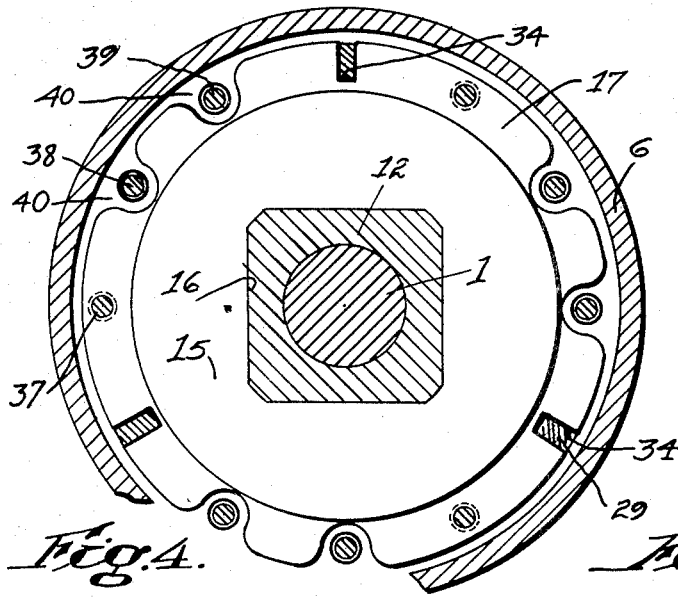
Fig. 4 is a horizontal sectional view along the line 4—4 of Fig. 1 looking in the direction of the arrows.

The driving shaft 1 carries a sleeve 12 held fast on the shaft by means of a pin 13, the sleeve 12 providing an integral end flange 14 which serves as a fixed abutment for the cooperating clutch elements, as will hereinafter appear. As best shown in Fig. 4, the outer surface of the sleeve 12 proper is angular in form and the sleeve carries a number of clutching elements 15 of frictional material each providing an opening 16 having the same angular form as the sleeve 12, so that the elements 15 are adapted to rotate with the sleeve 12, although capable of axial movement thereon. When the device is in an inoperative, or non-power transmitting condition, the clutching elements 15 are held in spaced relation by a series of disks designated 17, 18 and 19, respectively, which are carried by and turnable with the drum 6 of the driven element in a manner to be hereinafter described. There is also provided a fourth clutching element 15 below the lowermost disk 19 that is supported by an operating sleeve 20 turnable with the driving shaft 1 by means of a pin 21 received in diametrically opposed slots 22, so that the sleeve 20 may be shifted axially on the shaft 1. The operating sleeve 20 is rotatably supported against downward movement on the shaft 1 by means of a series of balls 23 interposed between the lower end of the sleeve 20 and a shifting collar 24 surrounding the shaft 1 and non-rotatable with respect thereto. When the device is in an inoperative condition, a spring 25 surrounding the shaft 1 between the lower end of the sleeve 12 and the upper end of the sleeve 20 serves to yieldingly maintain the lower end of the sleeve 20 in engagement with the balls 23 which in turn bear on the shifting collar 24. Consequently, any axial movement of the collar 24 on the shaft 1 is immediately transmitted to the operating sleeve 20.

Figure 3:
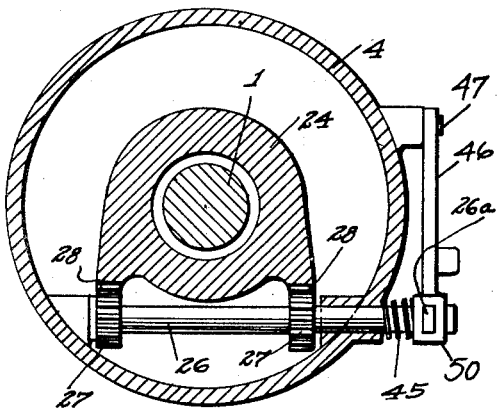
Fig. 3 is a horizontal sectional view along the line 3—3 of Fig. 1 looking in the direction of the arrows.

As best shown in Fig. 3 the collar 24 is adapted to be shifted axially on the shaft 1 to operate the sleeve 20 by means of a rock shaft 26 carried by the housing 4 and extending through the same at one side. The shaft 26 carries a pair of pinions 27 adapted to engage rack teeth 28 provided on opposite sides of the collar 24 so that turning of the rock shaft 26 is adapted to move the collar 24 upwardly on the shaft 1, which movement is transmitted directly to the operating sleeve 20 through the balls 23 to cause engagement between the frictional cluching elements 15 and the disks 17, 18 and 19. The shaft 26 carries an operating handle 26a beyond the housing 4 and the manner in which turning of the shaft 26 causes power to be transmitted by the coupling will next be described.

Figure 2:
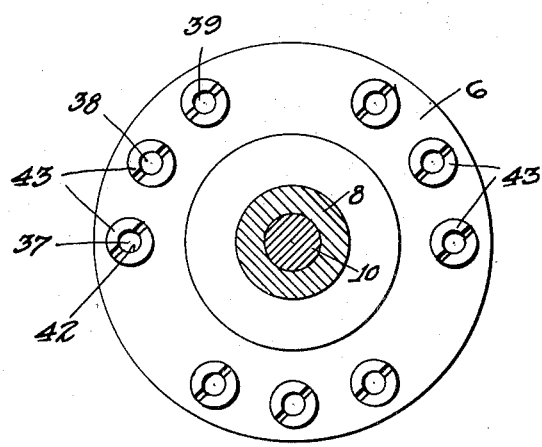
Fig. 2 is a horizontal sectional view along the line 2—2 of Fig. 1 looking in the direction of the arrows.
Figure 8:
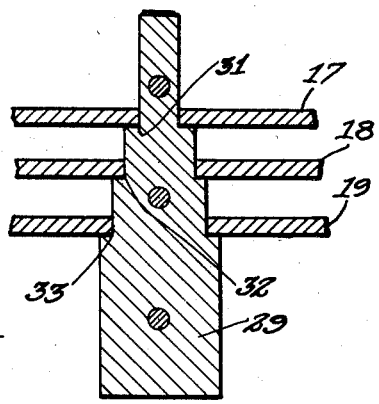
Fig. 8 is a fragmentary sectional view along the line 8—8 of Fig. 1, looking in the direction of the arrows.
Figure 5:
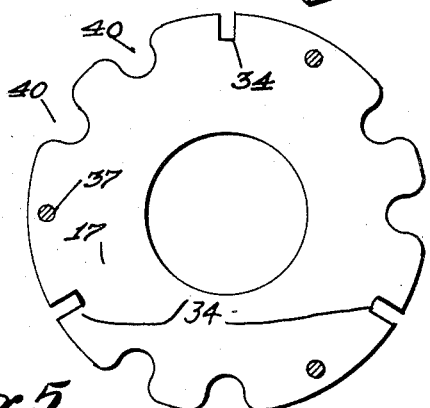
Figs. 5, 6 and 7 are fragmentary views respectively showing the construction of the driven clutch plates shown in Fig. 1.
Figure 6:
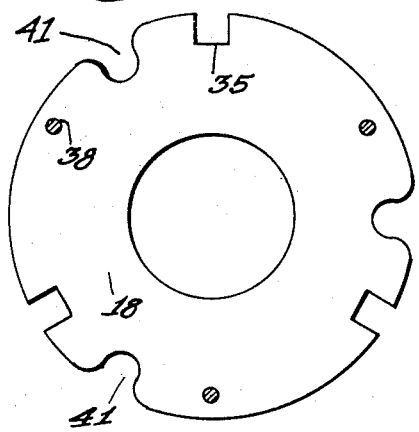
Figure 7:
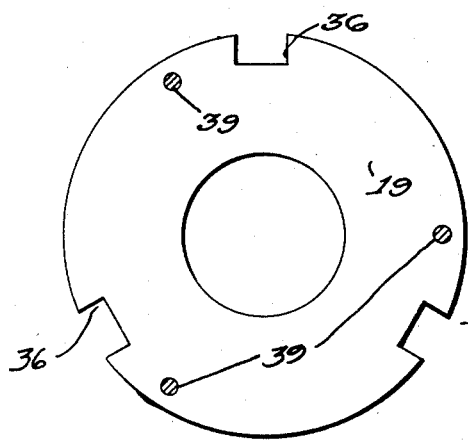

As best shown in Figs. 1, 4 and 8, the clutch disks 17, 18 and 19 are mounted for rotation with the driven drum 6 by means of a number of keys 29 secured to the inner periphery of the drum 6 at equal intervals in any suitable manner, as by screws 30. Each key 29 provides a series of stepped shoulders 31, 32 and 33 and the disks 17, 18 and 19 are provided with equally spaced notches 34, 35 and 36 corresponding in width to the portions of the keys 29 between the shoulders 31, 32 and 33 respectively. Thus when the parts are assembled as shown in Fig. 1, the uppermost disk 17 is limited in its movement along the axis of the shaft 1 by the shoulders 31 on the keys 29, and correspondingly, the movement of the disks 18 and 19 are limited by the shoulders 32 and 33. In order to insure that the disks 17, 18 and 19 will be normally positioned in engagement with the shoulders 31, 32 and 33 when the clutch is inoperative, the disks 17, 18 and 19 carry pins 37, 38 and 39 riveted thereto, all of which pins extend upwardly, with the pins 38 and 39 passing freely through notches 40 provided in the disk 17 and with the pins 39 passing freely through notches 41 provided in the disk 18. As best shown in Fig. 2, all of the pins 37, 38 and 39 are slidably received in openings 42 provided in bushings 43 threaded into the top flange 7 of the drum 6. Springs 44 surrounding the pins 37, 38 and 39 tend to yieldingly maintain the several disks 17, 18 and 19 in engagement with the several sets of shoulders 31, 32 and 33 provided on the keys 29 and the pressure which the springs 44 exert on the pins 37, 38 and 39 may be adjusted by turning the bushings 43 within the flange 7.

When it is desired to operate the clutch to cause power to be transmitted from the driving shaft 1 to the load connected to the drum 6, the rock shaft 26 is turned in any suitable manner to cause the pinions 27 to raise the collar 24 on the shaft 1. When this occurs the operating sleeve 20 raises the lowermost friction element 15 into engagement with the lowermost disk 19 thereby causing a certain amount of frictional engagement between the element 15 and disk 19. As this initial frictional engagement between the element 15 and disk 19 is usually not sufficient to cause the drum 6 to be rotated, further turning movement of the shaft 26 causes the sleeve 20 and the lowermost element 15 to raise the disk 19 until the element 15 carried thereby engages the middle disk 18 and it is obvious that continued movement of the sleeve 20 will finally cause the element 15 carried by the middle disk 18 to engage the upper disk. When this condition is reached all three disks 17, 18 and 19 are clamped between opposed friction elements 15 and power is thus transmitted to the sleeve 6. Since the uppermost friction element 15 is forced against the top flange 14 of the sleeve 12 when pressure is brought to bear on the uppermost disk 17, it necessarily follows that the greater the force exerted by the operating sleeve 20, the greater will be the degree of frictional engagement between the engaged elements 15 and disks 17, 18 and 19, so that varying amounts of power can be transmitted through the engaged friction elements and disks to meet varying load conditions. When the shaft 26 is turned in the opposite direction to move the collar 24 downwardly on the shaft 1, the spring 25 returns the operating sleeve 20 to its original position as shown in Fig. 1 and at the same time the several sets of springs 44 acting on the disks 17, 18 and 19 return the several disks to their original positions in engagement with the shoulders 31, 32 and 33 respectively, as indicated in Fig. 8.

Figure 9:
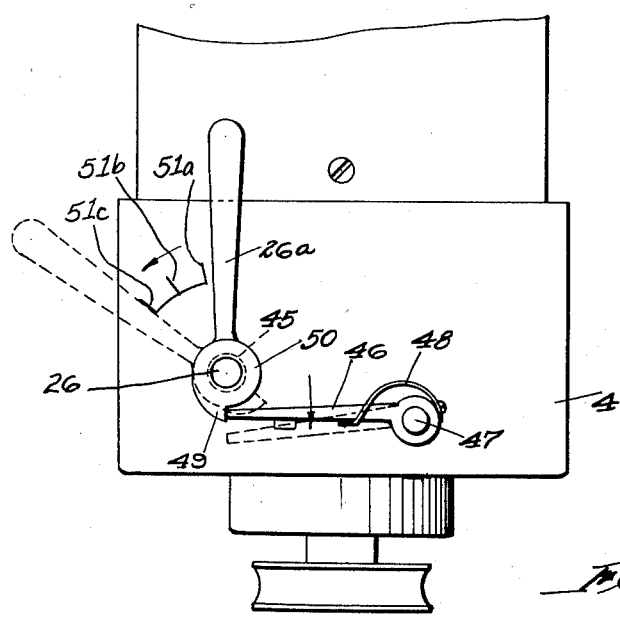
Fig. 9 is a fragmentary view illustrating a device for engaging the clutch.

In Fig. 9 there is shown an arrangement for quickly throwing the coupling into operative condition and for maintaining it in that condition for the transmission of power, without making it necessary for the operator to turn the handle 26a on the shaft 26. In this arrangement the handle 26a is biased towards turning in a counterclockwise direction, as viewed in Fig. 9, so as to engage the clutch plates with sufficient force for transmitting power by means of a spring 45, but turning of the handle is normally prevented by means of a latch 46. The latch 46 is mounted on a pivot pin 47, and the spring 48 tends to maintain the free end of the latch 46 in engagement with a lug 49 provided on the hub 50 of the handle 26a. Thus the latch 46 tends to hold the shaft 26 against turning by the spring 45, and so maintain the coupling in an inoperative condition. However, upon depressing the latch 46 in any suitable manner, as indicated in dotted lines, the spring 45 immediately acts to turn the shaft 26 in a counter-clockwise direction, thus raising the sleeve 24 to engage the clutch plates and so transmit power in the manner previously set forth. When it is desired to disengage the clutch the handle 26a is manually turned in a clockwise direction until the lug 49 depresses the end of the latch 46, whereupon the handle 26a may be released. This restores the parts to the position shown in Fig. 9, wherein the spring 45 acting on the shaft 26 is held in readiness to operate the clutch whenever the latch 46 is again depressed so as to disengage it from the lug 49.

Obviously, the clutch can be operated by the handle 26a to get varying degrees of frictional engagement between the plates, by manually controlling movement of the handle 26a after releasing the latch 46. In other words, the operator can turn the handle 26a gradually, so as to pick up the load slowly, and then when the handle 26a is entirely released, the spring 45 will hold the clutch in power transmitting condition. In order that the operator can readily determine the amount of plate engagement, as the handle 26a is thus turned, the housing 4 is provided with markings 51a, 51b, and 51c. The mark 51a indicates that the handle 26a has been turned far enough to frictionally engage the lowermost plate 19, while the marks 51b and 51c indicate engagement with the plates 18 and 17 respectively.

I claim,

1. In a device of the class described, the combination with a rotating driving element, a rotatable driven element and a series of pairs of co-operating plates carried by said elements, of means for maintaining each pair of plates in a predetermined position in which they are separated from each other a predetermined distance, said means comprising stepped keys engaging notches in said plates and means urging said plates against the steps on the keys.

2. In a device of the class described, the combination with a rotating driving element, a rotatable driven element and a series of pairs of co-operating plates carried by said elements, of means for yieldably maintaining the plates carried by one element a predetermined distance apart, said means comprising stepped keys engaging notches in said plates and spring means urging said plates towards the steps of the keys, and means for shifting said plates progressively to transmit varying amounts of power between said elements.

3. In a device of the class described, the combination with a rotating driving element, a rotatable driven element and a series of pairs of cooperating plates carried by said elements, of means for yieldably maintaining the plates carried by one element a predetermined distance apart, said means comprising stepped keys engaging notches in said plates, and means urging said plates against the steps on the keys, means for shifting said plates progressively for engaging the plates carried by the other element and means for varying the amount of frictional engagement between each pair of plates.

4. In a device of the class described, the combination with a rotating driving element, a rotatable driven element and a series of pairs of cooperating plates carried by said elements, of means for yieldably maintaining the plates carried by one element a predetermined distance apart, said means comprising stepped keys engaging notches in said plates, and means urging said plates against the steps on the keys, means for shifting said plates and means for varying the resistance to shifting movement offered by each plate.

5. In a device of the class described, the combination with a rotating driving element, a rotatable driven element, a series of pairs of cooperating plates carried by said elements, and means for maintaining the plates carried by one element a predetermined distance apart, of a member shiftable along the axis of said driving element and rotatable therewith for engaging said plates, operating means for normally urging said member toward said plates to move said plates into driving engagement and releasable means for holding said actuating member in a position in which said plates are disengaged.

6. In a device of the class described, the combination with a rotating driving element, a rotatable driven element, a series of pairs of cooperating plates carried by said elements, and means for yieldably maintaining the plates carried by one element a predetermined distance apart, of a sleeve shiftable along the axis of said driving element and rotatable therewith, an actuating member for said sleeve mounted on said driving element and secured against rotation, a spring acting on said actuating member for causing said sleeve to force said plates into frictional engagement, and a latch normally holding said sleeve out of engagement with said plates, whereby release of said latch automatically causes shifting of said actuating member and engagement of said plates.

7. In a device of the class described, the combination with a rotating driving shaft, a rotatable driven element, cooperating plates for transmitting power between said shaft and said element, and means for yieldingly maintaining the plates carried by one element a predetermined distance apart, of an operating member shiftable on said shaft and secured against rotation, a sleeve rotatable with said shaft and shiftable thereon to engage said plates, means for rotatably supporting said sleeve on said operating member, whereby movement of said member is transmitted to said sleeve, and releasable means for holding said operating member in a position in which said plates are disengaged.

LUKE LEWIS NAKASHIAN.